United States Patent
Krause et al.

[11] Patent Number: 5,732,842
[45] Date of Patent: Mar. 31, 1998

[54] TANK CLOSURE, ESPECIALLY FOR A MOTOR VEHICLE

[75] Inventors: Guenter Krause, Groebenzell; Georg Pollak, Germering, both of Germany

[73] Assignee: Bayerische Motoren Werke Aktiengesellschaft, Munich, Germany

[21] Appl. No.: 661,174

[22] Filed: Jun. 10, 1996

[30] Foreign Application Priority Data

Jun. 8, 1995 [DE] Germany .................. 195 20 971.0

[51] Int. Cl.⁶ .................................................. B62D 25/00
[52] U.S. Cl. ................... 220/254; 220/262; 220/86.2; 220/DIG. 33; 141/383; 70/425; 296/97.22
[58] Field of Search ................. 220/581, 582, 220/255, 260, 262, 329, 345, 348, 351, 254, 86.1, 86.2, DIG. 33; 141/383, 384, 386, 98, 231; 70/423, 425, 427, 158; 296/97.22

[56] References Cited

U.S. PATENT DOCUMENTS

| | | |
|---|---|---|
| 1,949,523 | 3/1934 | Wilson . |
| 3,267,707 | 8/1966 | Adams ............................... 70/423 |
| 5,435,358 | 7/1995 | Kempka et al. .......... 220/DIG. 33 X |
| 5,465,861 | 11/1995 | Kunz et al. ................. 220/86.2 X |
| 5,467,621 | 11/1995 | Gravino ................. 220/DIG. 33 X |
| 5,509,569 | 4/1996 | Hiranuma et al. ......... 220/DIG. 33 X |
| 5,544,780 | 8/1996 | Jue ............................ 220/DIG. 33 X |

FOREIGN PATENT DOCUMENTS

| | | |
|---|---|---|
| 0 266 705 A2 | 5/1988 | European Pat. Off. . |
| 29 29 192 C2 | 4/1981 | Germany . |
| 38 38 450 A1 | 11/1988 | Germany . |
| 40 39 269 C1 | 12/1990 | Germany . |
| 42 17 966 C1 | 5/1992 | Germany . |

*Primary Examiner*—Allan N. Shoap
*Assistant Examiner*—Nathan Newhouse
*Attorney, Agent, or Firm*—Evenson, McKeown, Edwards & Lenahan, P.L.L.C.

[57] ABSTRACT

Tank closure, especially for a motor vehicle, with a supporting part mounted on the tank in the peripheral area of a filling opening and receiving an actuating element which is rotatable around an axis that is approximately parallel to the central axis of filling opening. The actuating element is rotatable manually and/or by a filling arm of an automatic filling device into an open position that opens filling opening and in the opposite direction into a closed position that closes filling opening. A closing part guided approximately rectilinearly is located between supporting part and actuating element. The closing part is adjustable through an adjusting device by actuating element which opens filling opening when rotated to the open position, and which closes filling opening when rotated to the closed position.

18 Claims, 2 Drawing Sheets

TANK CLOSURE, ESPECIALLY FOR A MOTOR VEHICLE

BACKGROUND AND SUMMARY OF THE INVENTION

The invention relates to a tank closure, especially for a motor vehicle.

A tank closure of this kind is known from EP-A-0 266 705 which has a rotatable closing part that closes the filling opening of the fuel tank in a closed position. The filling opening is opened when the closing part is rotated into an angular position in which a through opening in the closing part is aligned with the filling opening. During the adjusting movement of the closing part from the closed position into the open position and vice versa, the through opening is moved along an approximately semicircular path in the closing part. After the closing part abuts a fixed sealing sleeve with axial pretensioning, areas of the sealing sleeve can expand into the through opening during rotation of the closing part, said areas then being forced out of the through opening when the closing part is turned further. The frictional stress on the sealing sleeve is increased as a result, and signs of wear appear that adversely affect the sealing function after only a short period of use.

In U.S. Pat. No. 1,949,523, the filling opening of a fuel tank is closable by a slide remotely controllable by a cable. The fuel tank can only be opened and closed manually from the passenger compartment. It is not possible to open the fuel tank by means of an automatic filling device.

An object of the present invention is to provide a tank closure which allows manual and automatic filling, with the seal provided at the filling opening being subjected to less stress.

This and other objects have been achieved according to the present invention by providing a tank closure for closing a filling opening of a tank, comprising a supporting part fastened to a peripheral area of the filling opening; an actuating element proximate the supporting part which is rotatable around an axis approximately parallel to a central axis of the filling opening; a closing part arranged between the supporting part and the actuating element; and an adjusting device operatively arranged between the actuating element and the closing part, said adjusting device being configured to move said closing part along an approximately rectilinear path between a closed position in which the closing part covers the filing opening and an open position in which the closing part is clear of the filling opening when the actuating element is rotated.

A manual rotary movement of the actuating element, or one performed automatically by the filling arm of an automatic filling device, is converted by the adjusting device into an approximately rectilinear adjusting movement of the closing part. The closing part is consequently displaced along the shortest path away from the filling opening into an open position and in the opposite direction into the closed position. The seal mounted on the filling opening, which cooperates with the closing part, is subjected to less stress as a result. The stress on the seal can be reduced even further by using a seal-stress-relieving device that initially lifts the closing part axially off the seal during rotation of the actuating element from the closed position into the open position, so that the seal can remain functional throughout the entire useful life of the tank closure. The adjusting device can have a fixed rotatable gear that meshes firstly with internal toothing on an inner circumference of the actuating element and secondly with a row of teeth on the closing part. Similarly, the adjusting device can have a crank guide or the like in which a pin or rib engages. Other adjusting devices are also possible which have a pivoted lever and/or a lever arm to convert motion and force, for example.

These and other objects, features and advantages of the present invention will become more readily apparent from the following detailed description when taken in conjunction with the accompanying drawings.

DETAILED DESCRIPTION OF THE DRAWINGS

Figure 1:
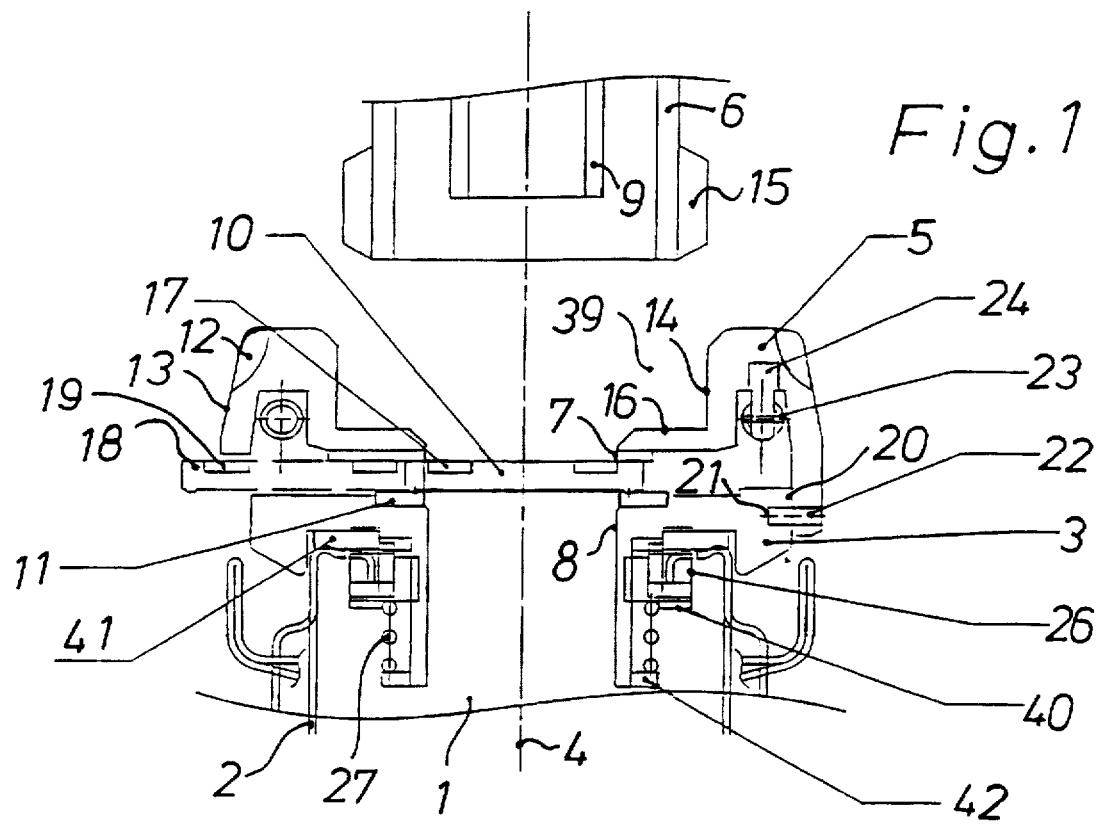
FIG. 1 shows a cross section of the tank closure according to a preferred embodiment of the invention, through the central axis of the filling opening corresponding to section line I—I in FIG. 3.

The tank closure shown in FIG. 1 is located on filling opening 1 of a fuel tank provided on a motor vehicle and has a supporting part 3 fastened to the peripheral area of filling opening 1. Filling opening 1 is formed for example on the projecting end of a neck 2 on the fuel tank. Supporting part 3 receives an annular actuating element 5 that is rotatable around central axis 4 of filling opening 1. The actuating element 5 is rotatable manually and/or by a filling arm 6 of an automatic filling device into an open position that opens filling opening 1 and in the opposite direction into a closed position that closes filling opening 1. A circular central opening 7 is formed in actuating element 5 and a circular central opening 8 is formed in supporting part 3. The central openings are aligned with central axis 4 and have a diameter slightly larger than filling pipe 9 of filling arm 6.

In the closed position shown, filling opening 1 is closed by a closing part 10 which, under axial pretensioning, abuts an annular seal 11 arranged concentrically with respect to filling opening 1 and fastened to supporting part 3. Closing part 10 can be adjusted by rotating actuating element 5, which is operatively connected to an adjusting device which moves the closing part 10 in a generally straight line from the closed position shown, away from filling opening 1 into an open position in which filling opening 1 is completely clear. The actuating element 5 may be manually rotated by manually exerting a rotational torque on actuating element 5 at an outer surface 13. The outer surface 13 may be provided with depressions 12, for example, configured as finger-engaging areas to aid in manual rotation of the actuating element 5.

Moreover, on an inner surface 14 of actuating element 5, force-engaging surfaces are formed for engagement with mating opposite surfaces 15 of a filling arm 6 of an automatic filling device. The filling arm 6 is insertable axially into actuating element 5 and is rotatable to transmit a torque to actuating element 5 to open and close filling opening 1. The force-engaging surfaces may be configured, for example, in the shape of an octagon, as multiple toothing, or any other of many well-known mating surfaces for transmitting a torque. Preferably, inner surface 14 has undercuts, not shown, in bottom area 16 of recess 39, which undercuts permit filling arm 6 to be inserted into the filling opening 1 at an angle relative to central axis 4.

In order for filling arm 6 to be inserted accurately into filling opening 1, a target guide device is provided that comprises a target marking 17 on closing part 10 that is visible from the outside. Target marking 17 is formed for example by a ring concentric with respect to central axis 4, said ring being inserted into a corresponding depression in closing part 10 and being aligned at its surface with closing part 10. Closing part 10 has an end area 18 which, in the closed position shown, projects slightly radially beyond actuating element 5, and in the open position projects considerably radially beyond the actuating element. The closing part 10, however, need only be of sufficient size to cover the filling opening 1, and therefore need not extend radially beyond the actuating element in either the closed or opened position, particularly in a case where space around the tank closure is limited. End area 18 is marked with a signal color 19 that clearly and visibly shows the open position of closing part 10.

In order to subject annular seal 11 to as little stress as possible during the rotation of actuating element 5, a seal-stress-relieving device is provided which initially lifts closing part 10 axially off annular seal 11 when actuating element 5 is turned from the closed position into the open position. The seal-stress-relieving device comprises a guide groove 21 on an outer 20 or inner circumference of supporting part 3 or of the actuating element 5 that runs in a generally circumferential direction with an axial pitch. The guide groove 21 is engaged by a guide pin 22 or the like that slightly projects radially from the other part, i.e. from the actuating element 5 or the supporting part 3 in which the guide groove 21 is not disposed.

A rotary opening movement of actuating element 5 takes place against the force of two tension springs 23 guided in a curved, circumferentially-oriented channel. Each of the springs is connected at one end to a pin 24, fastened to actuating element 5. The other ends of tension springs 23 are attached to pin 25 shown in FIG. 2 which is fastened to supporting part 3.

The tank closure is fastened releasably to neck 2 of the fuel tank. It can be used to replace a conventional tank closure on a motor vehicle, for example. For this purpose it is merely necessary to lock supporting part 3 firmly to neck 2 by placing it on the neck with a seal 41 interposed and performing a clockwise rotation of retaining ring 26 in FIG. 1. Compression spring 27 then exerts the required force on retaining ring 26 through spring support ring 42, with a spring clip 40 abutting ring 26. The mounted tank closure can be removed by lifting the entire tank closure, including the actuating ring 5 and supporting part 3, off neck 2 and rotating it counterclockwise.

Figure 2:
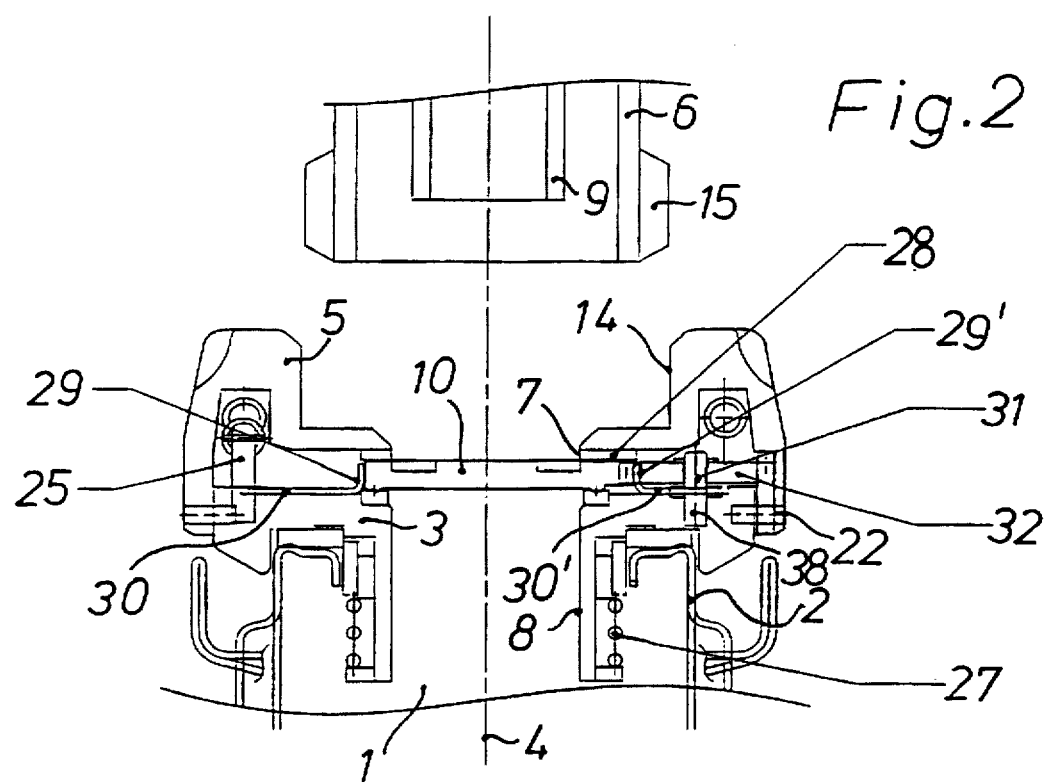
FIG. 2 is a view corresponding to FIG. 1 along section line II—II in FIG. 3.
Figure 3:
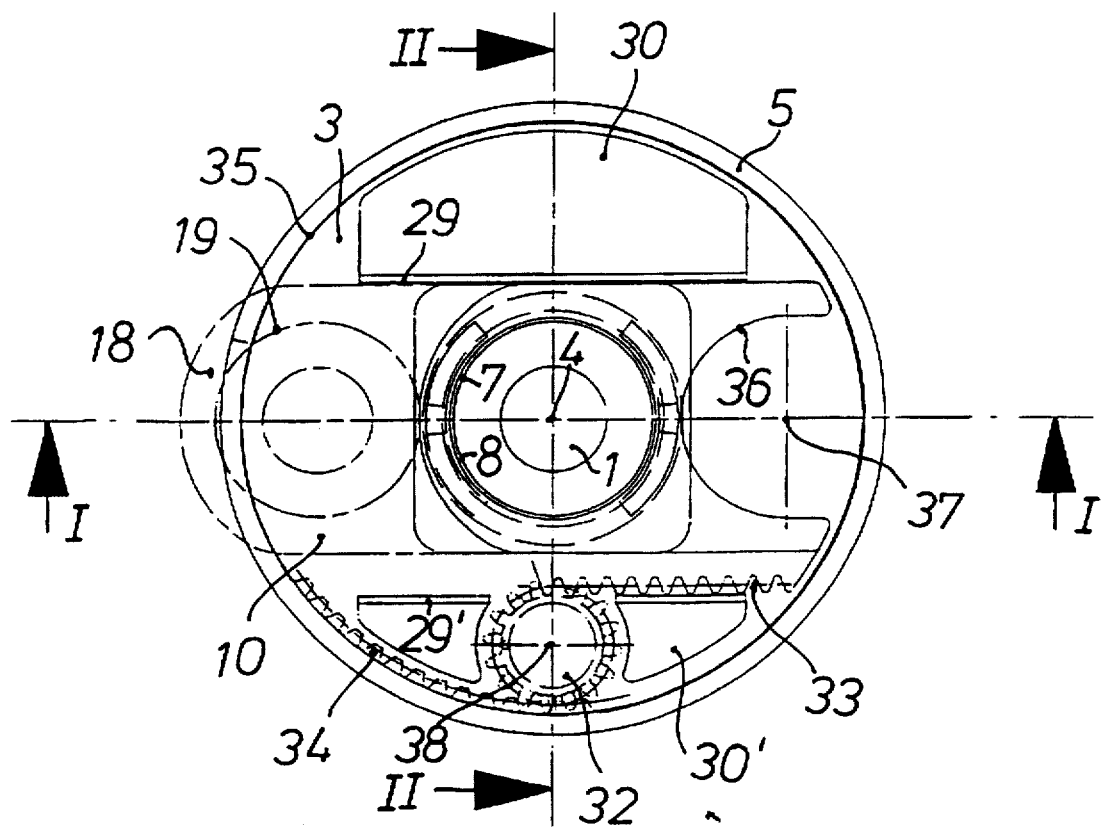
FIG. 3 is a top view of the tank closure.

The view shown in FIG. 2, sectioned along line II—II in FIG. 3, shows further details. A Teflon washer 28 is fastened to actuating element 5 to reduce friction between actuating element 5 and closing part 10. For rectilinear guidance, closing part 10 is guided between legs 29, 29' of bent guide panels 30, 30' on supporting part 3, radially with respect to central axis 4 of filling opening 1.

The adjusting device for transmitting the rotary movement of actuating element 5 to closing part 10 comprises a gear 32 that is rotatable around axis 38 of a pin 31 supported on supporting part 3. As FIG. 3 shows, gear 32 meshes firstly with a row of teeth 33 running in the direction of movement of closing part 10, the teeth 33 being on one lateral edge of closing part 10, and secondly with teeth 34 on an inner circumference 35 of actuating element 5. FIG. 3 also shows that closing part 10 has an approximately semicircular peripheral cutout 36 whose axis 37 in the open position is approximately aligned with central axis 4 of filling opening 1 and central opening 7 in actuating element 5 as well as with central opening 6 in supporting part 3. Rotational axis 38 of gear 32 runs laterally next to closing part 10, parallel to central axis 4 of filling opening 1. When closing part 10 is in its open position, end area 18 projects from the outer contour of actuating element 5 and the marking labeled with signal color 19 indicates the open position of the tank closure, so that inadvertently leaving the tank closure open can be avoided, especially during manual filling. In order to prevent actuating element 5 and hence closing part 10 from being automatically reset during manual filling by the force of tension springs 23, 23', shown particularly in FIG. 1, a retaining or latching device, not shown, may be provided which holds or locks closing part 10 in the open position in a positive or non-positive manner. When a latching device is used, it can be unlatched under remote control, so that when the filler nozzle is not inserted into filling opening 1, closing part 10 is automatically returned to the closed position by the force of tension springs 23, 23'.

The invention can also be implemented differently from the embodiment. The closing part is preferably adjustable exactly rectilinearly. Likewise the closing part can be made only approximately rectilinearly adjustable. The adjusting device for transmitting the rotary movement of the actuating element to the closing part can be designed in different ways. A different gear mechanism, using more than one gear, can be used for example. Similarly, instead of a gear device, a pivoted lever and/or a lever linkage can be provided that cooperates through one lever arm with the actuating element and through another lever arm with the closing part. The adjusting device can also be formed by a crank guide on the actuating element or closing part, into which a pin or rib on the other part, the closing part or actuating element, engages. It is also possible for a rib on one of the above parts to be guided between two pins or the like on the other part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A tank closure for closing a filling opening of a tank, comprising:

a supporting part fastened to a peripheral area of the filling opening;

an actuating element proximate the supporting part which is rotatable around an axis approximately parallel to a central axis of the filling opening;

a closing part arranged between the supporting part and the actuating element; and an adjusting device operatively arranged between the actuating element and the closing part, said adjusting device being configured to move said closing part along a rectilinear path between a closed position in which the closing part covers the filing opening and an open position in which the closing part is clear of the filling opening when the actuating element is rotated.

2. A tank closure according to claim 1 wherein the actuating element is rotatable around said central axis of the filling opening.

3. A tank closure according to claim 2, wherein the adjusting device comprises a rotatable gear with a fixed axis of rotation, said gear meshing firstly with teeth on an inner circumference of the actuating element and secondly with a row of teeth on the closing part, which row of teeth extends in the direction of the rectilinear path of the closing part.

4. A tank closure according to claim 1, wherein the closing part has an approximately semicircular peripheral cutout whose axis in the open position is approximately aligned with the central axis of the filling opening and with a central opening in each of the supporting part and the actuating element.

5. A tank closure according to claim 1, wherein the adjusting device comprises a rotatable gear with a fixed axis of rotation, said gear meshing firstly with teeth on an inner circumference of the actuating element and secondly with a row of teeth on the closing part, which row of teeth extends in the direction of the rectilinear path of the closing part.

6. A tank closure according to claim 4, wherein the axis of rotation of the gear extends laterally next to closing part and approximately parallel to the central axis of the filling opening.

7. A tank closure according to claim 5, wherein the closing part is guided approximately radially with respect to the central axis of the filling opening between legs of bent guide panels of the supporting part.

8. A tank closure according to claim 5, wherein the closing part has an end area that projects radially beyond the actuating element in the open position, said end area being marked with a signal color.

9. A tank closure according to claim 5, wherein the closing part has a target marking which is approximately aligned with the filling opening in the closed position and is visible from the outside through a central opening in the actuating element.

10. A tank closure according to claim 5, further comprising a seal-stress-relieving device configured to initially lift closing part axially off an annular seal fastened on the supporting part approximately concentrically with respect to the filling opening when actuating element is rotated to move the closing part from the closed position into the open position.

11. A tank closure according to claim 10, wherein said seal-stress-relieving device comprises a guide groove and a guide pin which engages said guide groove, said guide groove being disposed on an outer or inner circumference of one of said supporting part and said actuating element, and said guide pin projecting radially from the other of said supporting part and said actuating element, said guide groove extending in a generally circumferential direction with an axial pitch.

12. A tank closure according to claim 1, wherein the closing part is guided approximately radially with respect to the central axis of the filling opening between legs of bent guide panels of the supporting part.

13. A tank closure according to claim 12, further comprising a seal-stress-relieving device configured to initially lift closing part axially off an annular seal fastened on the supporting part approximately concentrically with respect to the filling opening when actuating element is rotated to move the closing part from the closed position into the open position.

14. A tank closure according to claim 13, wherein said seal-stress-relieving device comprises a guide groove and a guide pin which engages said guide groove, said guide groove being disposed on an outer or inner circumference of one of said supporting part and said actuating element, and said guide pin projecting radially from the other of said supporting part and said actuating element, said guide groove extending in a generally circumferential direction with an axial pitch.

15. A tank closure according to claim 1, wherein the closing part has an end area that projects radially beyond the actuating element in the open position, said end area being marked with a signal color.

16. A tank closure according to claim 1, wherein the closing part has a target marking which is approximately aligned with the filling opening in the closed position and is visible from the outside through a central opening in the actuating element.

17. A tank closure according to claim 1, further comprising a seal-stress-relieving device configured to initially lift closing part axially off an annular seal fastened on the supporting part approximately concentrically with respect to the filling opening when actuating element is rotated to move the closing part from the closed position into the open position.

18. A tank closure according to claim 17, wherein said seal-stress-relieving device comprises a guide groove and a guide pin which engages said guide groove, said guide groove being disposed on an outer or inner circumference of one of said supporting part and said actuating element, and said guide pin projecting radially from the other of said supporting part and said actuating element, said guide groove extending in a generally circumferential direction with an axial pitch.

* * * * *